Dec. 4, 1945.　　　　D. DILEO　　　　2,390,356
FISHING LINE REEL BRAKE
Filed May 5, 1945
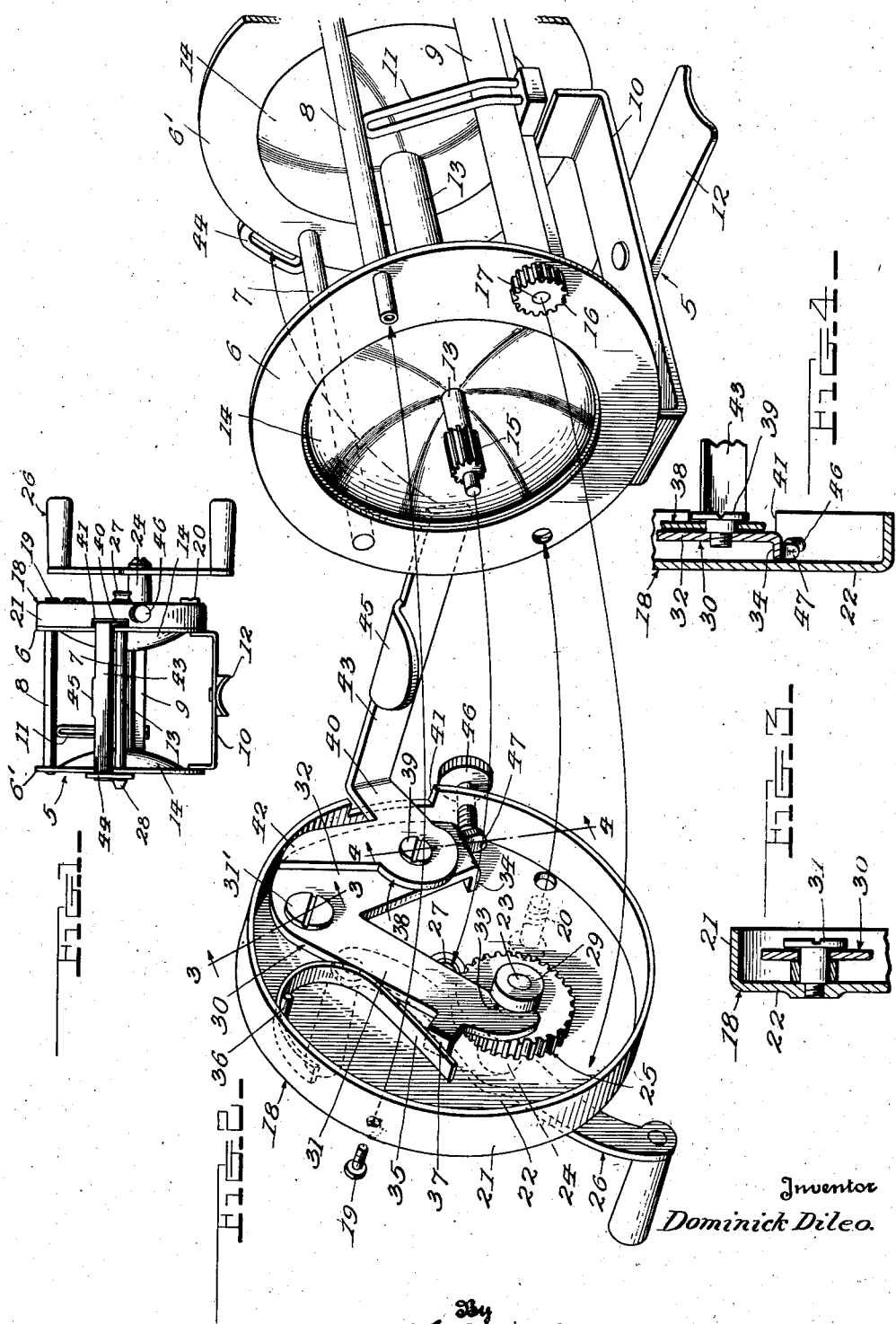
Inventor
Dominick Dileo.
By
H. B. Wilson & Co.
Attorney Patented Dec. 4, 1945

2,390,356

UNITED STATES PATENT OFFICE 2,390,356

FISHING LINE REEL BRAKE

Dominick Dileo, Utica, N. Y.

Application May 5, 1945, Serial No. 592,173

5 Claims. (Cl. 188—83)

The invention aims to provide a fishing line reel having a new and improved friction brake readily controllable by the thumb of the fisherman's hand holding the rod, for use in casting.

In carrying out the above end, a further object is to provide an exceptionally simple and inexpensive construction which may be readily incorporated in practically any conventional reel structure.

A still further object is to make simple provision for holding the brake in released position whenever desired.

Figure 1 of the accompanying drawing is a rear elevation of a reel embodying the invention.

Figure 2 is a perspective view with the casing detached from one end of the reel frame, showing the brake mechanism within said casing.

Figures 3 and 4 are detail sectional views on lines 3—3 and 4—4 respectively of Fig. 2.

A preferred construction has been illustrated and will be rather specifically described, with the understanding, however, that within the scope of the invention as claimed, variations may be made.

The reel frame 5 includes the usual end members 6 and 6' connected by cross members 7, 8, 9 and 10. The member 9 houses the conventional double screw for actuating the automatic line guide 11, and the cross member 10 is secured to the usual seat 12 to be fastened upon a fishing pole in the conventional way. The reel includes the usual reel shaft 13 and the concavo-convex end disks 14 which rotate within the confines of the end members 6 and 6'. On the right hand end of the reel shaft 13 (when viewed from the rear) is a pinion 15, and at 16 I have shown a gear on the line guide operating screw, one end of which is shown at 17.

A casing 18 is secured against the outer side of the end ring 6 by means of screws 19 and 20, said casing having a cylindrical side wall 21 and an outer end wall 22. A shaft 23 extends through a bearing 24 secured to the end wall 22 and is provided with a gear 25 to mesh with the pinion 15 and the gear 16, the outer end of said shaft having the usual double crank 26. The end wall 22 also carries another bearing 27 for one end of the reel shaft 13, the other end being of course mounted by an appropriate bearing (not shown) carried by the end member 6'. This end member may also, if desired, carry a "drag" controllable by the button 28 shown only in Fig. 1 of the drawing.

The shaft 23 is provided with a brake drum 29 which is preferably in the form of a hub on the gear 25. This drum is cooperable with one end of a brake lever 30 which is pivotally mounted at 31' for pivotal movement in a plane transverse to the shaft 23, said brake lever being disposed within the casing 18. In the present disclosure, the brake lever 30 is of angular form, said lever having a front arm 31 which declines forwardly from the mounting means 31' and rests frictionally upon the brake drum 29, and a rear arm 32 which declines rearwardly from said mounting means 31 and terminates near the cylindrical wall 21. The arm 31 preferably has a concave inner edge portion 33 contacting with the drum 29, and the lower end of the arm 32 is formed with a lateral lug 34 to abut the inner side of the casing end wall 22 to aid in stabilizing said lever. A spring 35 suitably mounted at 36 in the casing 18, acts upon the brake lever 30 to hold it frictionally engaged with the brake drum 29, with pressure determined at the factory. It is preferable to provide the lever arm 31 with an angular lug 37 against which the spring 35 bears.

A releasing lever 38 is provided for the brake lever 30, said releasing lever being pivotally mounted at 39 upon the lower end of the brake lever arm 32, for pivotal movement in a plane parallel with the plane of movement of said brake lever. This lever 38 has an operating portion 40 which projects rearwardly through a slot 41 in the casing side wall 21, and said releasing lever is also formed with an upwardly projecting cam 42 which contacts with the inner side of said casing side wall 21. It will thus be seen that depression of the operating portion 40 will cause the lever 38 to fulcrum about the upper end of the cam 42, thus moving the mounting means 39 of said lever 38 inwardly and swinging the brake lever 30 in brake-releasing direction. It is preferable to provide the releasing portion or operating portion 40 of the lever 38 with a lateral inwardly projecting finger bar 43 which extends behind the reel. The free end of this finger bar is received in an appropriate guide 44 secured to the end member 6', and at 45 I have shown a thumb plate on said bar 43 upon which the fisherman may place the thumb of the hand which holds the rod, to readily control the brake.

In order that the brake may be held entirely out of action if desired, I thread a screw 46 inwardly through the rear portion of the casing side wall 21. This screw acts on the lower end of the brake lever arm 32 when said screw is threaded inwardly, and I prefer to provide said arm 32 with a lug 47 for contact with the inner end of said screw.

From the foregoing taken in connection with the accompanying drawing, it will be seen that novel and advantageous construction has been provided for carrying out the objects of the invention. By use of thumb pressure on the thumb plate 45, not only can the brake be readily controlled, but the hand holding the rod has an added and naturally stronger grip upon the rod handle. The reel functions noiselessly without the disturbing click of an ordinary reel and there is absolutely no chance for the line to become tangled while casting. When the desired distance is reached by the line, the brake can be used to instantly and effectively prevent said line from going to a greater distance. No adjustments need be made in casting. A fisherman will be able to cast without releasing the brake and still the reel will remain noiseless. The improved construction may be embodied in practically any conventional reel structure.

While preferences have been disclosed, attention is again invited to the possibility of making variations within the scope of the invention as claimed.

I claim:

1. In a fishing line reel of the type having a frame, a casing secured to one end of said frame and having a cylindrical side wall and an outer end wall, a reel-driving shaft extending through said outer end wall, and a hand crank on the outer end of said shaft; a brake drum on said shaft within said casing, a brake lever in said casing, means mounting said brake lever for pivotal movement in a plane transverse to said shaft, said brake lever having one end frictionally contacting with said brake drum, spring means acting on said brake lever to hold said one end thereof in frictional contact with said brake drum, a releasing lever, and means mounting said releasing lever on the other end of said brake lever for pivotal movement in a plane parallel with the plane of movement of said brake lever, said releasing lever having an operating portion extending through an opening in said casing and also having a cam portion contacting with the inner side of said cylindrical side wall, whereby pivotal movement of said releasing lever will swing said brake lever to control the frictional contact of said brake lever with said brake drum.

2. A structure as specified in claim 1; said operating portion of said releasing lever projecting rearwardly from said cylindrical side wall and having a lateral inwardly projecting thumb piece to be depressed for effecting brake release.

3. A structure as specified in claim 1; together with a screw threaded inwardly through said cylindrical side wall in position to hold said brake lever released if desired.

4. In a fishing line reel of the type having a frame, a casing secured to one end of said frame and having a cylindrical side wall and an outer end wall, a reel-driving shaft extending through said outer end wall, and a hand crank on the outer end of said shaft; a brake drum on said shaft within said casing, an angular brake lever in said casing, means mounting said brake lever for pivotal movement in a plane transverse to said shaft, said brake lever having a front arm declining forwardly from said mounting means and lying frictionally on said brake drum, said brake lever also having a rear arm declining rearwardly from said mounting means and terminating near said cylindrical side wall, a spring acting on said brake lever and holding said front arm frictionally against said brake drum, a releasing lever, and means mounting said releasing lever on the lower end of said rear arm for pivotal movement in a plane parallel with the plane of movement of said brake lever, said releasing lever having an operating arm projecting rearwardly through an opening in said cylindrical wall, said releasing lever also having an upwardly projecting cam contacting with the inner side of said cylindrical wall, whereby depression of said operating portion will cause said releasing lever to move said brake lever in releasing direction.

5. A structure as specified in claim 4; together with a screw threaded inwardly through said cylindrical side wall in position to abut said rear arm and hold said brake lever released if desired.

DOMINICK DILEO.